March 4, 1947.                D. ROSENBLATT                2,416,774
CHUCK AND MEANS FOR ATTACHING TOOLS THERETO
Filed June 7, 1944                    2 Sheets-Sheet 1
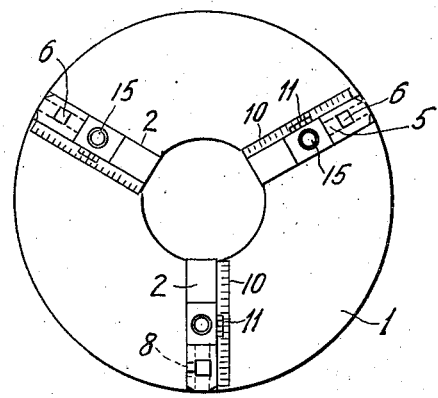
FIG.1
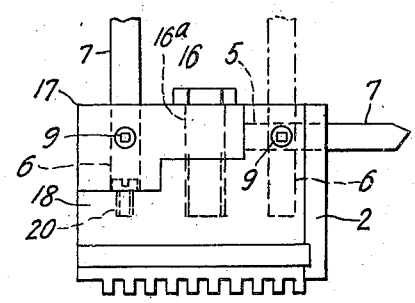
FIG.3
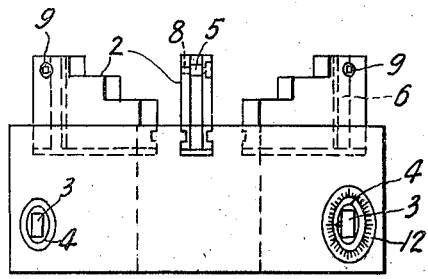
FIG.2
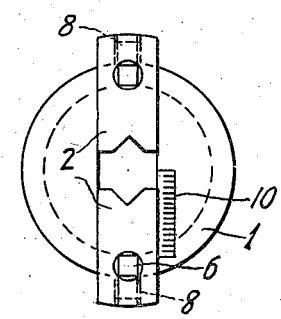
FIG.4
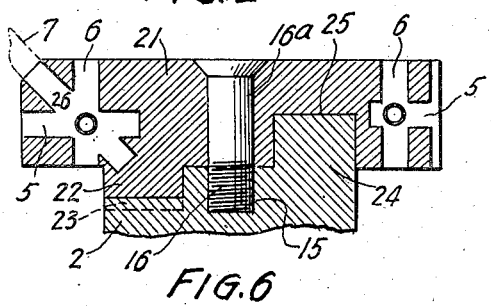
FIG.6
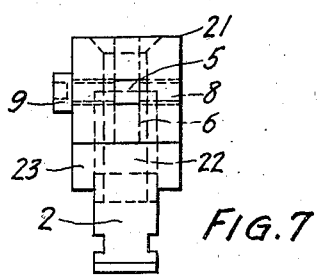
FIG.7
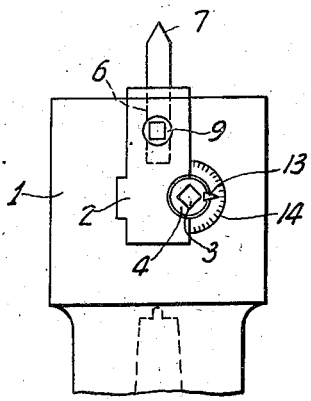
FIG.5  Inventor
D. Rosenblatt
By Glaser & Downing & Seebold
Attys.

March 4, 1947.                D. ROSENBLATT                    2,416,774
                CHUCK AND MEANS FOR ATTACHING TOOLS THERETO
                    Filed June 7, 1944              2 Sheets-Sheet 2

Inventor
D. Rosenblatt
By Glaser Downing Seehle
Attys

Patented Mar. 4, 1947

2,416,774

UNITED STATES PATENT OFFICE 2,416,774

CHUCK AND MEANS FOR ATTACHING TOOLS THERETO

David Rosenblatt, North Carlton, Victoria, Australia

Application June 7, 1944, Serial No. 539,042
In Australia May 22, 1943

6 Claims. (Cl. 90—60)

This invention relates to chucks for machine tools and has special reference to improvements whereby chucks may be used as carriers for tools or cutters for machining operations in addition to the normal function of holding work upon which machining is to be performed.

In this invention the tools or cutters are carried by the chuck jaws, and more specifically the improvements relate to the fixing of tools to the chuck jaws and the mounting on the latter of attachments having means for holding tools in operative position.

The invention is applicable to chucks having radially adjustable jaws, such as self-centering chucks in which the jaws are adjusted simultaneously, and chucks of independent jaw type in which the jaws are adjusted separately. The chuck jaws may be of any appropriate dimensions suitable for holding tools therein or the mounting of tool-carrying attachments thereon.

Advantage is taken of the radial adjustment of the jaws for setting the tools at required cutting locations from the central or longitudinal axis of a chuck. For the purpose of facilitating accurate setting of the tools, the face of the chuck adjacent each jaw may be marked with an appropriate scale and provided with a vernier. A micrometer head may be provided on one or more of the chuck operating spindles if required.

According to one form of the invention, the jaw of a chuck is constructed as a tool holder in which a tool or cutter is securely fixed in operative position. In constructing the jaw as a tool holder, the former is provided with sockets or holes of appropriate cross-sectional shape and dimensions to receive cutting tools.

One or more tool sockets may be provided, and two of the same may be positioned at right angles or at other angles to each other and may be located in the same or in parallel planes. Thus for instance, two sockets may be formed at right angles, one of the sockets being parallel to the axis of the chuck and the other radial, so that a tool in the former socket will project axially from the face of the jaw, while a tool in the latter socket will extend outwardly or radially from the circumferential edge of the jaw. If a third socket be provided, the same may be located between and in desired angular relation to the other two sockets, which latter may be disposed at right angles and located as above indicated.

The tools or cutters are secured in the sockets by clamping screws in engagement with tapped holes formed in the jaw body transversely and at right angles to the sockets. When two or more sockets are provided, the same may have a common point of intersection and a clamping screw located transversely to the sockets at the point of intersection is adapted to secure a tool in any one of the several sockets.

In another form of the invention, tools or cutters are mounted in an attachment securely fixed to the jaws of a chuck, the tools or cutters being fixed in sockets formed and positioned in the attachment in any of the several ways above indicated. Each end of such an attachment may be formed with tool sockets, or one end of the attachment may have tool sockets, while the other end of the same may be bifurcated to receive knurling tools or roller steadies.

The attachment is secured to a chuck jaw by one or more screws, and a driving connection between the attachment and the chuck jaw is effected by engagement of one or more steps on the latter with slots or recesses in the former. As an alternative or additional connection, projections on the inner side of the attachment may fit into holes or sockets formed in the chuck jaw.

A chuck carrying tools in accordance with the invention may be applied to engine lathes, boring machines, repetition lathes of turret or capstan types, milling and drilling machines and other machine tools in which rotating or traversing tools or cutters are used.

The invention can be used for the following machine tool operations, namely:

Facing, boring, turning, thread cutting (inside and outside), countersinking, knurling, milling operations, such as the cutting of slots or grooves and profiling, screwing and cutting of pipes of various sizes, long shaft turning, machining of shell cases, parting tool work and forming centre points and drills.

In the accompanying drawings:

Fig. 1 is an end elevation of a three jaw self-centering chuck in which the jaws are provided with means for holding tools in accordance with the invention.

Fig. 2 is a plan view of the self-centering chuck shown in Fig. 1.

Fig. 3 is a side elevation on a larger scale of a chuck jaw having means for holding tools therein and a detachable tool holder according to the invention.

Fig. 4 is an end elevation of a two-jaw drill chuck wherein the jaws are provided with means for holding tools in accordance with the invention.

Fig. 5 is a plan view of the drill chuck shown in Fig. 4.

Fig. 6 is a longitudinal section of a tool-carrying attachment constructed in accordance with the invention and secured to a chuck jaw.

Fig. 7 is an end elevation of the tool-carrying attachment and chuck jaw shown in Fig. 6.

Figure 8:
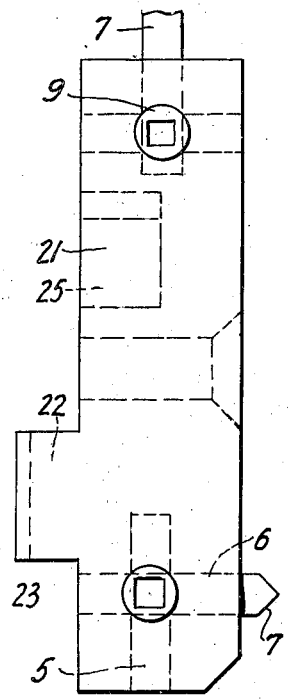
Fig. 8 is a detached side elevation of the tool-carrying attachment illustrated in Figs. 6 and 7.
Figure 9:
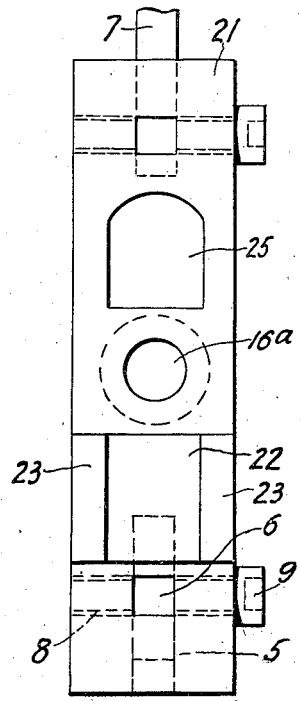
Figs. 9 and 10 are plan views of the tool-carrying attachment in Fig. 8 fitted with a cutting tool and a knurling tool respectively.
Figure 10:
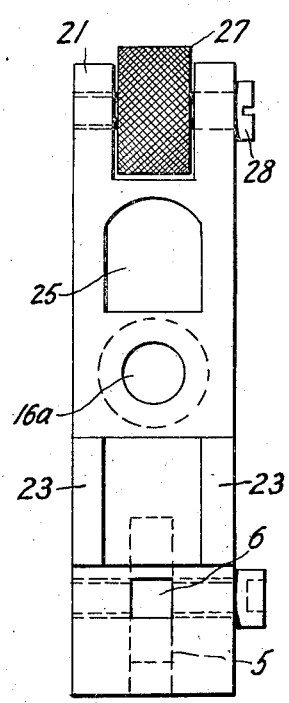

Referring in the first instance more particularly to Figs. 1, 2 and 3 of these drawings, the numerals 1 and 2 denote respectively the chuck body and the jaws, the latter being fitted and slidable in radial slots in the former in normal manner and being simultaneously actuated by a key (not shown) adapted to be inserted in one of the key slots 3 formed in the operating spindles 4 of the chuck.

Each of the jaws 2 is formed with a radial tool socket 5 and an axial tool socket 6, the sockets being consequently at right angles each to the other. The sockets 5 and 6 intersect and are located in the central radial planes of the jaws 2, and the said sockets are square in section and of required dimensions to accommodate the shanks of similarly shaped cutting tools 7.

Engaged with tapped holes 8 formed in the jaws 2 in alignment with the intersection of the sockets 5 and 6 are clamping screws 9 which are adapted to secure tools 7 in either of the intersecting sockets in operative positions.

Marked on the body 1 of the chuck parallel with the jaws 2 are appropriately graduated scales 10 which indicate the radial location of the jaws 2 with respect to the axis of the chuck. Verniers 11 may be provided which in conjunction with the scales 10 enable the radial setting of the tools 7 to be adjusted within fine limits of accuracy. Still finer setting of the tools may be effected by the use of a micrometer head 12 attached to one of the chuck spindles 4. The tools 7 project outwardly from the sockets 5 and 6 and when adjusted to extend from the same for required distances are clamped securely by the screws 9.

Referring now to Figs. 4 and 5, the chuck body 1 is provided with two diametrically aligned jaws 2 which upon insertion of an appropriate key (not shown) in the slot 3 of the spindle 4 may be adjusted to simultaneously approach or recede from the axis of the chuck. In each jaw 2 there is formed a socket 6 parallel with the axis of the chuck. The sockets 6 are made of required shape and dimensions to receive tools or cutters 7 which are secured after adjustment by clamping screws 9 fitted in radial tapped holes 8 in the chuck jaws 2.

To facilitate adjustment of the jaws when setting the tools 7 at required distances from the axis of the chuck an appropriately dimensioned scale 10 may be marked on the body 1, the zero mark of the scale being in alignment with the chuck axis. Finer setting of the tools may be effected by an index 13 secured to the chuck spindle 4 and adapted to indicate adjustment on an arcuate scale 14 marked on the chuck body 1.

The tools or cutters 7, as previously mentioned, may be mounted in an attachment adapted to be fixed to a chuck jaw 2 instead of being secured directly in the same.

For the purpose of securing a tool-carrying attachment to the chuck jaws 2, the latter may be provided with tapped holes 15, see Figs. 1, 3, 6 and 7, to receive fixing screws 16 passed through a hole 16a in attachment.

As shown in Fig. 3, a tool-carrying attachment comprises an angular block 17 seated upon the inner and middle jaw steps (respectively indicated by 18 and 19) and secured to the chuck jaw 2 by a fixing screw 16 passed through the hole 16a and engaged with the tapped hole 15. The block 17 may be maintained in fixed position by a screw or dowel 20 fixed in the inner step 18 or by lugs or projections (not shown) engaging the sides of the jaw 2. The block 17 is formed with a socket 6 in which a tool 7 may be secured by a clamping screw 9 as previously described.

Attention being directed to Figs. 6 to 10 inclusive, it will be noted that the attachment comprises an elongated block 21 approximately square in transverse section and of somewhat greater width than the chuck jaw 2, see particularly Fig. 7.

A screw 16 passed through a hole 16a in the block and engaged with the tapped hole 15 in the jaw, secures the block to the jaw, the inner side of the former being seated firmly upon the middle step 19 of the latter. An inward extension or boss 22 on the block 21 is seated upon the inner step 18 of the jaw 2, while lugs 23 on opposite sides of the block fit against the sides of the same step and the outer step 24 is fitted in a correspondingly shaped recess 25 formed in the inner face of the block.

It will be understood that by means of the screw 16 and the lugs 23, and the fitted engagement of the step 24 with the recess 25, the block 21 will be secured very rigidly to the chuck jaw 2.

The attachment may be provided with tool sockets at each end, thus a radial socket 5 and an axial socket 6 may be formed in the block 21 at each end of the same and a third socket 26 angularly related to and intersecting the sockets 5 and 6 may be provided at either or both ends of the block (see Fig. 6). A clamping screw 9 passed through a tapped hole 8 in the jaw at the point of intersection of the sockets 5, 6 and 26 is adapted to secure a tool in any of the same in operative position.

The attachment may be provided at one end only with tool sockets and the opposite end of the same may be bifurcated to receive a knurling tool or roller 27 or alternatively a plain roller steady, which may be interchanged and mounted to rotate upon a screw 28 passed transversely through the block 21.

Figure 11:
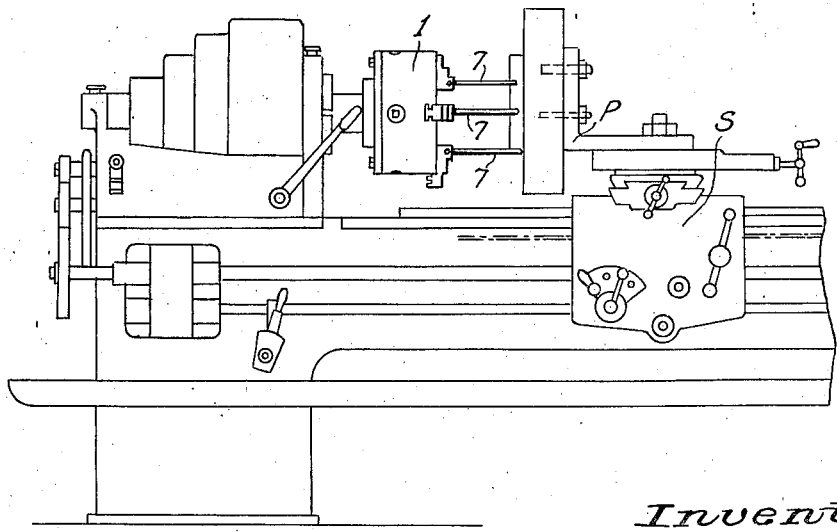
Fig. 11 is a fragmentary side elevation of a lathe including a chuck carrying tools supported by tool holding means or attachments in accordance with the invention.

In use, a chuck carrying tools 7 fixed directly in the jaws 2 or in an attachment secured to the jaws as described, may be mounted on the headstock spindle of a lathe, the work to be machined being secured to the lathe saddle or preferably to an angle plate P or like fixture mounted upon and fastened to the lathe saddle S as clearly illustrated in Fig. 11.

If the work be secured to a fixture on the lathe saddle and be located coaxially with the lathe centres, turning, boring, screw-cutting, knurling and other lathe operations may be performed by traversing the saddle in normal manner to feed the work to appropriate tools rotating with the chuck and set to required radius by adjustment of the chuck jaws 2.

By the use of formed cutters in the tool sockets, profile milling may be performed by mounting the work on the lathe saddle and traversing the same across the lathe bed. In similar manner the facing of work and the cutting of slots or recesses in the same may be effected by the use of appropriate cutters.

It will be understood that similar milling operations may be performed by mounting the chuck fitted with suitable cutters on the spindle of a milling machine while the work is secured to the machine table.

Many boring, turning and other machining operations may be performed on a drilling machine, wherein a chuck fitted with tools as described, is mounted on the spindle while the work is fixed to the machine table.

If an independent jaw chuck be used, tools in the axial sockets 6 in the jaws may be set at different radial distances from the axis of the chuck and a series of concentric grooves will be cut in the face of work mounted on a lathe saddle. Moreover, by setting the tools to project from the sockets 6 at gradually decreasing distances from the innermost to the outermost tool, a series of concentric rings or washers may be simultaneously cut from a plate secured to a fixture mounted on the lathe saddle.

By making the jaws 2 or the tool carrying attachments of required length and mounting tools therein, a complete disc of very large diameter or an arcuate piece of large radius may be cut from a plate mounted on a fixture secured to a lathe saddle. This method will produce a smooth finished edge and will avoid the irregularities incidental to the use of a cutting torch. The method is of special service when relatively fragile work, such as thin plate, is to be machined which would bend or break if attempts were made to mount it in chuck jaws.

These uses of the invention are given by way of example, but it will be obvious that the invention may be employed with advantage in the performance of many other machine tool operations.

In the uses of the invention referred to, the work is fixed while the chuck with cutters or other tools thereon revolves. However, it will be apparent that the work may revolve while the chuck and tools may be traversed without rotation. Accordingly, a chuck fitted with appropriate tools may be mounted on a lathe saddle, a machine table or other support for the carrying out of various machining operations.

I claim:

1. A chuck for use with machine tools having stepped adjustable jaws, tool-carrying blocks seated upon the steps of the adjustable jaws, sockets in the tool carrying blocks for the mounting of the tools or cutters, means for clamping the tools or cutters in operative positions within said sockets, and means for securing the tool-carrying blocks to the stepped adjustable jaws.

2. A chuck for use with machine tools as claimed in claim 1, wherein the means for securing the tool-carrying blocks to the stepped adjustable jaws comprise tapped holes in the steps of the adjustable jaws, screws passed through the tool-carrying blocks and engaging the tapped holes, recesses in the tool-carrying blocks to receive steps of the adjustable jaws, and projections on said blocks engaging the adjustable jaws.

3. In combination with a chuck having adjustable stepped jaws for use with machine tools, a tool-carrying attachment comprising an elongated block adapted to fit the steps of an adjustable jaw, means for holding tools or cutters at either or both ends of the elongated block, a hole in the elongated block to receive a screw for engagement with a tapped hole in the adjustable jaw, a recess in the elongated block to accommodate a step of the adjustable jaw, and projections on said block to engage the sides of the adjustable jaw.

4. A chuck for use with machine tools, including a body adapted for rotation and having a plurality of radial grooves in the outer face thereof, jaws adjustable in the radial grooves, at least two tool sockets formed in the jaws and having a common point of intersection, and clamping means located at the point of intersection of the tool sockets and adapted to secure a tool in either of said sockets.

5. A chuck for use with machine tools including a body adapted for rotation and having a plurality of radial grooves in the outer face thereof, jaws adjustable in the radial grooves, a radial tool socket in each adjustable jaw, an axial tool socket intersecting the radial tool socket, an axially inclined tool socket passing through the point of intersection of the radial and axial tool sockets, and clamping means located at the common point of intersection of the tool sockets and adapted to secure a tool in any one of said sockets.

6. A chuck as claimed in claim 5, in which the clamping means comprise a tapped hole in each adjustable jaw in alignment with the common intersection of the tool sockets, and a binding screw in threaded engagement with the tapped hole and bearing on said tool.

DAVID ROSENBLATT.

REFERENCES CITED

The following references are of record in the file of this patent:

UNITED STATES PATENTS

| Number | Name | Date |
| --- | --- | --- |
| 1,920,035 | Stephens | July 25, 1933 |
| 230,400 | Brown | July 27, 1880 |
| 1,229,174 | Williams | June 5, 1917 |
| 1,391,564 | Morris | Sept. 20, 1921 |
| 109,747 | Mahlon | Nov. 29, 1870 |
| 341,876 | Bishop | May 18, 1886 |
| 1,904,950 | Neckerman | Apr. 18, 1933 |

FOREIGN PATENTS

| Number | Country | Date |
| --- | --- | --- |
| 143,784 | Vogl (German) | Sept. 3, 1903 |
| 222,504 | British | Sept. 27, 1924 |

OTHER REFERENCES

Ex parte Hill, C. D. 1924, page 21.